United States Patent [19]

Wu

[11] Patent Number: 5,074,448
[45] Date of Patent: Dec. 24, 1991

[54] GOLF CART SCORE BOARD AND HANDLEBAR ANGULAR POSITION ADJUSTING STRUCTURE

[76] Inventor: Ching-Chang Wu, No. 35-1, Jih Hsin Street, Tu Cheng Hsiang, Taipei Hsien, Taiwan

[21] Appl. No.: 661,145

[22] Filed: Feb. 27, 1991

[51] Int. Cl.⁵ .............................................. B60R 9/00
[52] U.S. Cl. ........................................ 224/274; 224/919; 224/277; 403/97; 273/320
[58] Field of Search ............ 224/274, 277, 918, 42.43, 224/42.44, 919; 206/315.2, 315.3, 315.5, 315.9; 190/117; 108/99, 152; 403/97; 273/32 B, 32 D, 32 E

[56] References Cited

U.S. PATENT DOCUMENTS

| | | | |
|---|---|---|---|
| 3,156,000 | 11/1964 | Westhoff | 224/274 X |
| 3,907,056 | 9/1975 | Thomas, III | 403/97 X |
| 4,570,894 | 2/1986 | Miele | 224/918 X |
| 4,614,452 | 9/1986 | Wang | 403/97 X |
| 4,917,343 | 4/1990 | Wainscott | 403/97 X |
| 4,970,760 | 11/1990 | Hawkins, Jr. | 224/918 X |
| 5,004,137 | 4/1991 | Wu | 224/274 |

Primary Examiner—Henry J. Recla
Assistant Examiner—Glenn T. Barrett
Attorney, Agent, or Firm—Varndell Legal Group

[57] ABSTRACT

A golf cart score board and handlebar angular position adjusting structure, comprising a screw rod fastened with a lock nut to secure a handlebar and a score board to a connecting rod which is fixedly fastened in a golf cart's main frame. The handlebar and the score board have each a toothed portion engaged with the toothed portion at either side of the connecting rod with a helical spring each set therebetween. Therefore, the handlebar and the score board can be adjusted to a desired angle relative to the connecting rod and the golf cart's main frame by loosening the lock nut from the screw rod and then fastening it tight.

1 Claim, 4 Drawing Sheets

GOLF CART SCORE BOARD AND HANDLEBAR ANGULAR POSITION ADJUSTING STRUCTURE

BACKGROUND AND SUMMARY OF THE INVENTION

The present invention relates to golf cart and relates more particularly to a golf cart score board and handlebar angular position adjusting structure in which the score board and the handlebar of a golf cart can be rotates at one end of the main frame thereof and firmly retained at a desired angle relative to said main frame.

FIG. 1 illustrates a known structure of golf cart in which a score board is fixedly attached to a handlebar which is fixedly secured to and longitudinally aligned with the main frame of the golf cart. Because the angular position of the score board can not be adjusted relative to the handlebar and the main frame of the golf cart, one must bend over to the position of the score board while scoring. The present invention is designed to eliminate this problem. It is therefore the main object of the present invention to provide a golf cart score board and handlebar angular position adjusting structure permitting a golf score board to be conveniently adjusted to fit in with user's position while scoring.

BRIEF DESCRIPTION OF THE DRAWINGS

FIG. 4-1 is a schematic sectional view illustrating that the handlebar, the score board and the connecting rod are respectively engaged together.

FIG. 4-2 is a schematic sectional view illustrating that the handlebar, the score board and the connecting rod are respectively disengaged from one another.

DETAILED DESCRIPTION OF THE PREFERRED EMBODIMENT

Figure 1:
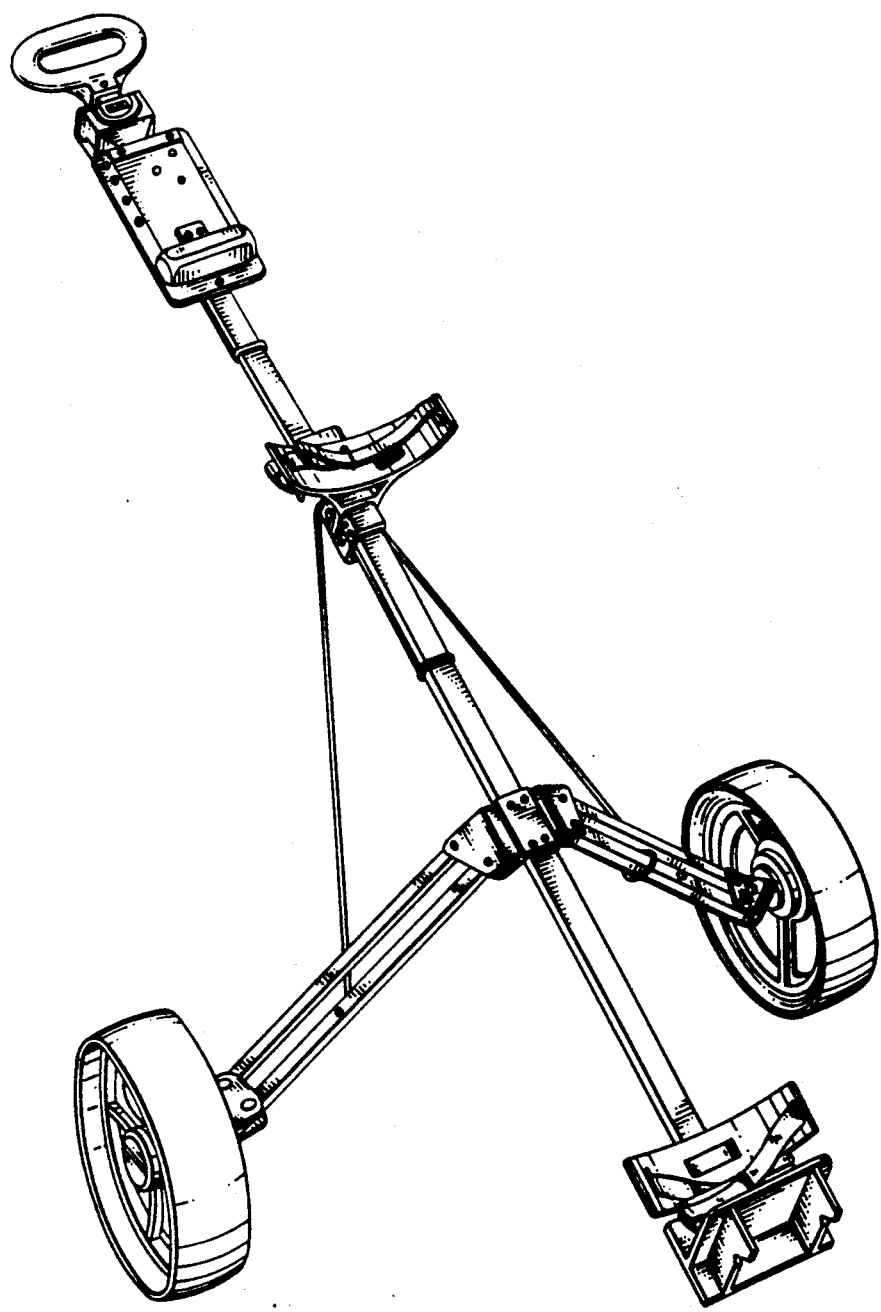
FIG. 1 illustrates a golf cart constructed according to the prior art.
Figure 2:
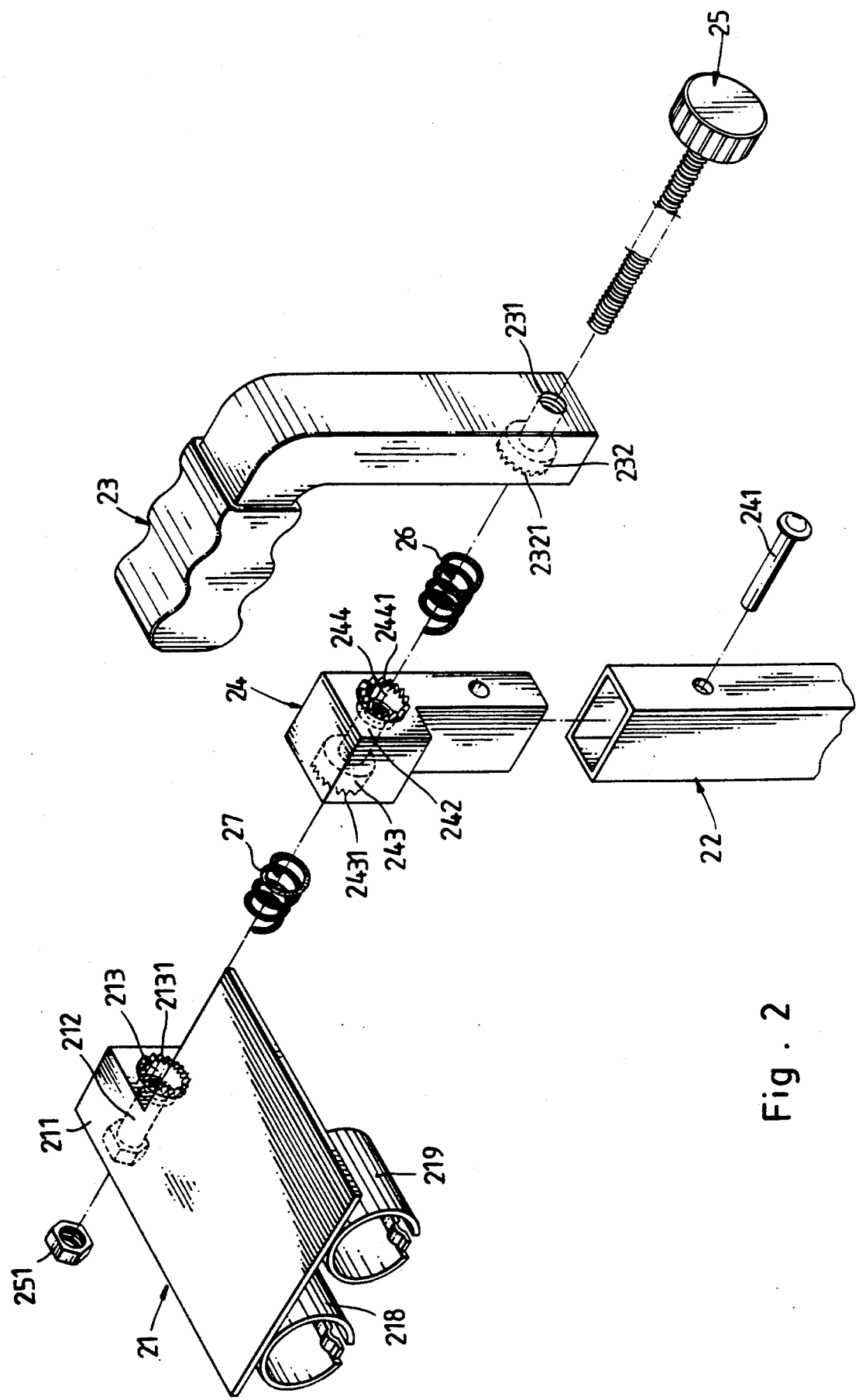
FIG. 2 is a perspective fragmentary view of the preferred embodiment of the present invention.
Figure 3:
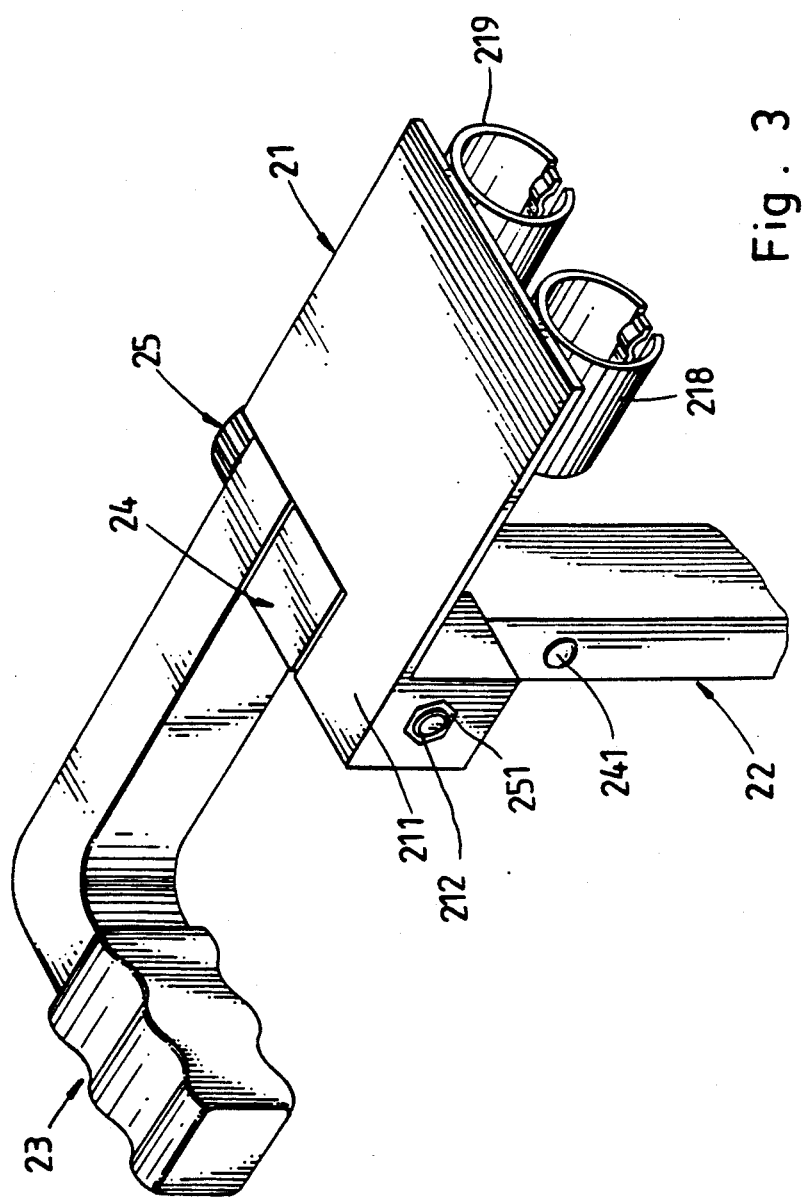
FIG. 3 is a perspective assembly view of the preferred embodiment of the present invention.
Figures 2, 4:
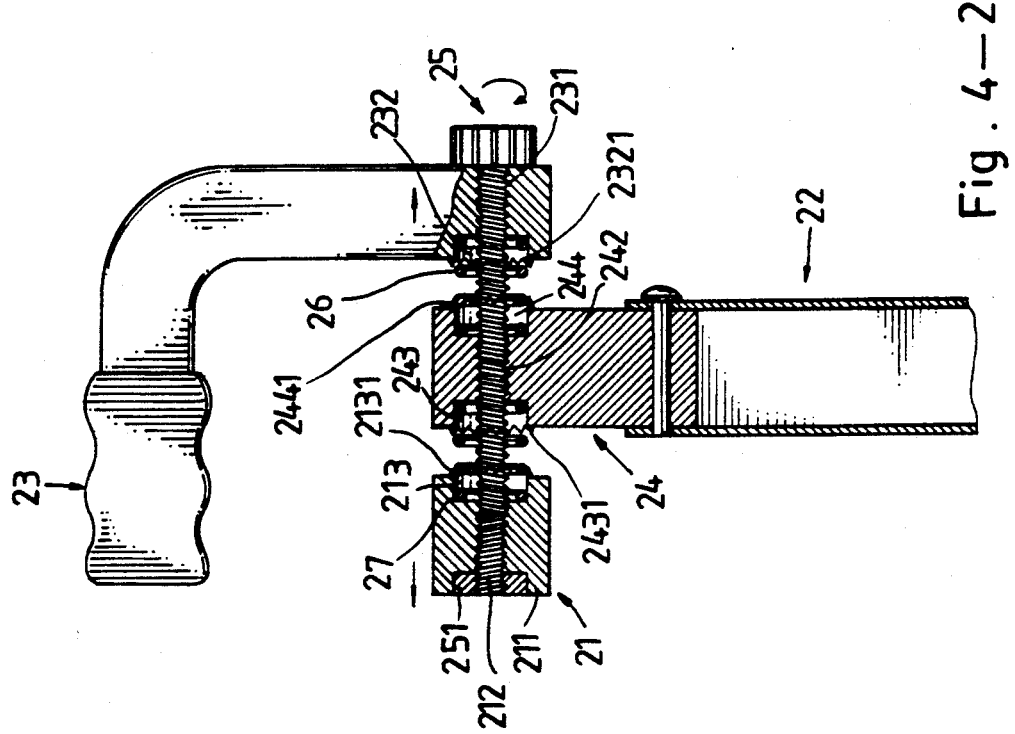
Figures 1, 4:
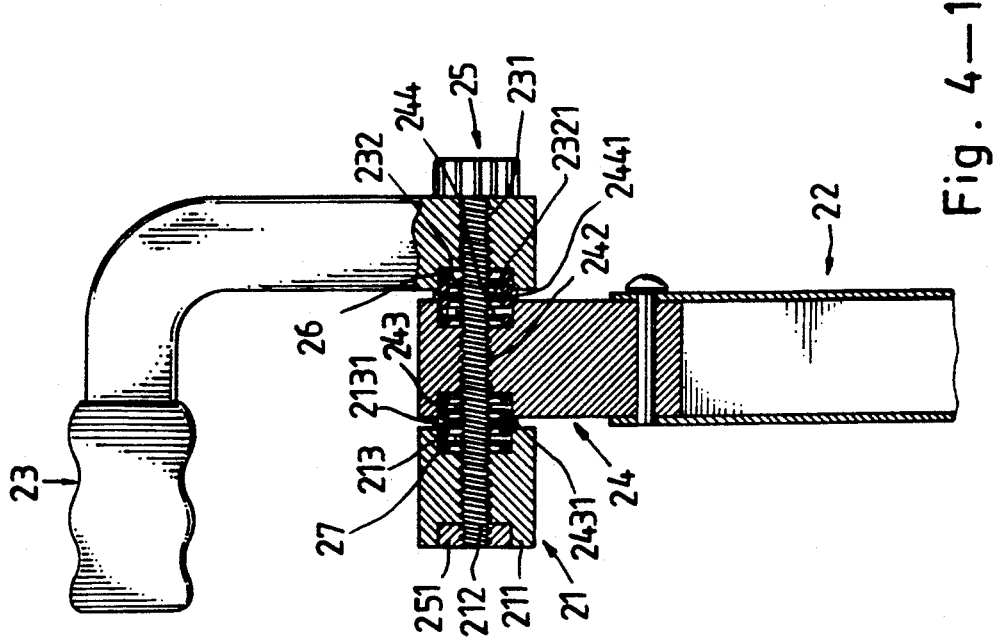

Referring to FIGS. 2, 3, 4-1 and 4-2, therein illustrated is the preferred embodiment of the present invention which is generally comprised of a handlebar 23 and a score board 21 respectively releasably connected to a connecting rod 24, by a screw rod 25, a lock nut 251 and two helical springs 26 and 27, wherein the connecting rod 24 is fastened in the main frame 22 of a golf cart at one end and secured in position by a rivet 241.

Handlebar 23 has a circular recessed hole 232 laterally disposed at one end, a bolt hole 231 transversely piercing through said circular recessed hole 232, and a toothed portion 2321 around said recessed hole 232 at the outside. The circular recessed hole 232 has a diameter much larger than the bolt hole 231 so that a helical spring 26 can be set therein and stopped at the outside of the bolt hole 231.

Connecting rod 24 has one end fastened in a golf cart's main frame 22 by a rivet 241, and a bolt hole 242 transversely piercing through the opposite end thereof. Two circular recessed holes 243 and 244 are respectively made at the two opposite ends of the bolt hole 242. Similar to the circular recessed hole 232 of the handlebar 23, the two circular recessed holes 243 and 244 are respectively designed in diameter much larger than the bolt hole 242 and have each a toothed portion 2431 or 2441 at the outside around the periphery thereof.

Score board 21 has a projecting block 211 laterally disposed at one end, which projecting block 211 has a bolt hole 212 transversely piercing therethrough at the middle with a recessed hole 213 formed at one end which recessed hole 213 has a toothed portion 2131 made at the outside around the periphery thereof. Two cylindrical golf ball holders 218 and 219 may be made on the score board 21 at the bottom for keeping golf balls.

Helical spring 26 is received in between the circular recessed hole 244 of the connecting rod 24 and the circular recessed hole 232 of the handlebar 23 which helical spring 27 is received in between the circular recessed hole 243 of the connecting rod 24 and the circular recessed hole 213 of the score board 21.

Screw rod 25 is fastened in the bolt holes 231, 242 and 212 and locked with lock nut 251 to firmly secure the handlebar 23, the connecting rod 24 and the score board 21 together, permitting the toothed portion 2431 and 2441 of the connecting rod 24 to the respectively engaged with the toothed portion 2131 of the score board 21 and the toothed portion 2321 of the handelbar 23.

When the lock nut 251 is removed from the screw rod 25, the helical springs 26 and 27 respectively push the handlebar 23 and the projecting block 211 of the score board 21 outwards to disengage the toothed portions 2321 and 2131 from the toothed portions 2431 and 2441 respectively. Thus, the handlebar 23 and the score board 21 can be respectively rotated relative to the connecting rod 24 and the main frame 22 of the golf cart and then, secured in a desired angle by fastening the lock nut 251 to the screw rod 25 again. Therefore, the score board 21 can be conveniently adjusted to a suitable angle for making scores.

I claim:

1. A golf cart score board and handlebar angular position adjusting structure, comprising:
   a connecting rod adapted to be fastened to a main frame of a golf cart having a bolt hole transversely made at one end, a first recessed hole at one side, a second recessed hole at an opposite side, said first and second recessed holes being longitudinally aligned with said bolt hole and each having a toothed portion around the periphery thereof;
   a handlebar having a bolt hole and a circular, recessed hole transversely made at one end which recessed hole having a toothed portion around the periphery thereof and engaged with the toothed portion of the first recessed hole of said connecting rod;
   a first spring means set in the first recessed hole of said connecting rod and the recessed hole of said handlebar;
   a score board having a projecting block laterally disposed at one end, said projecting block having a bolt hole transversely piercing therethrough with a recessed hole formed at one end and a toothed portion around the periphery thereof and engaged with the toothed portion of the second recessed hole of said connecting rod;
   a second spring means set in the second recessed hole of said connecting rod and the recessed hole of aid handlebar;
   a screw rod fastened in the bolt holes of said handlebar, said connecting rod and said score board in proper order and locked up with a lock nut to firmly secure said handlebar, said connecting rod and said score board together; and wherein said lock nut can be loosened from said screw rod, permitting said score board and said handlebar to be rotated to a desired angle relative to said connecting rod and then secured in position by fastening said lock nut tightly on said screw rod again.

* * * * *